United States Patent
Byers et al.

(10) Patent No.: US 6,458,276 B1
(45) Date of Patent: Oct. 1, 2002

(54) METHOD AND APPARATUS FOR BIODEGRADATION OF ALKYL ETHERS AND TERTIARY BUTYL ALCOHOL

(75) Inventors: Dallas Lea Byers, Katy, TX (US); Charles Lee Meyer, Houston, TX (US); Paul Ta-chin Sun, Katy, TX (US); Joseph Patrick Salanitro, Houston, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/858,619

(22) Filed: May 16, 2001

(51) Int. Cl.[7] .............................. C02F 3/04; C02F 3/34
(52) U.S. Cl. .................. 210/611; 210/617; 210/631; 210/694; 210/759; 210/150; 210/220; 210/908; 435/262.5; 435/309.2
(58) Field of Search ........................ 210/610, 611, 210/617, 618, 620, 631, 694, 759, 150, 151, 209, 220, 908; 435/262, 262.5, 264, 309.1, 309.2

(56) References Cited

U.S. PATENT DOCUMENTS

| | | | |
|---|---|---|---|
| 4,493,895 A | 1/1985 | Colaruotolo et al. | 435/262 |
| 5,037,240 A | 8/1991 | Sherman | 405/128 |
| 5,054,961 A | 10/1991 | Sherman | 405/128 |
| 5,057,221 A | * 10/1991 | Bryant et al. | 210/617 |
| 5,277,518 A | 1/1994 | Billings et al. | 405/128 |
| 5,330,652 A | * 7/1994 | Goldman et al. | 210/150 |
| 5,425,598 A | 6/1995 | Pennington | 405/118 |
| 5,472,294 A | 12/1995 | Billings et al. | 405/128 |
| 5,474,934 A | 12/1995 | Adamus et al. | 435/262.5 |
| 5,531,895 A | * 7/1996 | Alford et al. | 210/610 |
| 5,641,679 A | 6/1997 | Pierce | 435/262 |
| 5,653,288 A | 8/1997 | Billings et al. | 166/305.1 |
| 5,750,364 A | 5/1998 | Salanitro | 435/42 |
| 5,811,010 A | 9/1998 | Salanitro | 210/610 |
| 5,814,514 A | 9/1998 | Steffan et al. | 435/262 |
| 5,902,734 A | 5/1999 | Salanitro | 435/42 |
| 5,906,932 A | * 5/1999 | Kuriyama et al. | 435/309.1 |
| 6,350,381 B2 | * 2/2002 | Kilkenny et al. | 210/617 |
| 6,365,397 B1 | * 4/2002 | Salanitro | 435/262.5 |

OTHER PUBLICATIONS

"Performance of Fixed Bed Reactors with Two–Phase Upflow and Downflow", lliuta, Ion, J. Chem. Tech. Biotechnol. 1997, 69, 47–56.

"Experience with GAC–Fluid Bed for Bioremediation of BTEX–Contaminated Groundwaters", G. Mazewski, J. Tiffany & Hansen, Biotechnol. Ind. Waste Treat. Biorem, (Pub. 1996) 333–344 (1992).

"Bioreactor Treatment of MTBE and TCE In Contaminated Ground Water", by Miller, Michael E., et al, from In Situ and On–Site Bioremediation, Pap. Int. In Situ On–Site Biorem. Symp., 4th (1997), vol. 5, 89–94.

"A Review of Potential Technologies for the Treatment of Methyl tertiary Butyl Ether in Drinking Water", Anthony Brown et al. , University of Southern California Dept. of Civil and Environmental Engrg.

K. Mo, et al. Appl. Microbiol. Biotechnol. (1997) 47:69–72.
The Press Democrat. Santa Rosa, CA, Aug. 1 (1999) MTBE, article by Steve Hart.

* cited by examiner

Primary Examiner—Christopher Upton (57) ABSTRACT

Disclosed is a method for treating groundwater, or other water streams contaminated with oxygenate(s), particularly MTBE and TBA, characterized by improved biodegradation of MTBE, the biodegradation of TBA, and reduced frequency of the need to change the carbon bed, which comprises inoculating a biodegrader capable of degrading said oxygenate on an activated carbon bed through a rigid tubular instrument having a plurality of holes around the circumference of the end used for inoculation of the carbon bed by a method that optimizes dispersion and colonization; and flowing said groundwater, or other water stream contaminated with said oxygenate through a structure having a top, bottom and sides and a predetermined volume containing said bed of activated carbon having said biodegrader inoculated thereon. The invention is also an apparatus for biodegradation of oxygenate(s).

91 Claims, 3 Drawing Sheets

METHOD AND APPARATUS FOR BIODEGRADATION OF ALKYL ETHERS AND TERTIARY BUTYL ALCOHOL

FIELD OF THE INVENTION

This invention relates to the purification of groundwater contaminated with oxygenate(s) such as alkyl ethers and tertiary butyl alcohol. This invention further relates to a method and apparatus that result in the efficient biodegradation of these compounds to carbon dioxide and water. In particular, the invention relates to the remediation of groundwater contaminated with methyl-t-butyl ether (MTBE) and other ethers using fixed beds of granular activated carbon (GAC) seeded with specific MTBE degrading bacteria cultures and to a new method of seeding said carbon beds to avoid plugging, where the required amount of culture to degrade the MTBE can be determined by a formula. Also disclosed are oxygen and nutrient delivery systems.

BACKGROUND OF THE INVENTION

In response to the 1990 Clean Air Act Amendments gasoline suppliers began to blend fuels with oxygenate(s), such as alkyl ethers, particularly methyl-t-butyl ether (MTBE). MTBE often constitutes as much as 10 to 15% by volume of unleaded gasoline.

After using oxygenated fuels for about a decade, it has become apparent that the cleaner burning fuels pose distinct threats to groundwater resources. In particular, many oxygenate(s) are very soluble in water and are slow to degrade in the environment; hence they tend to accumulate in water resources once released into the environment.

Due to leaks in underground storage tanks or spills, the groundwater at many gasoline retail, distribution, and manufacturing sites is contaminated with benzene, toluene, ethyl benzene, and xylene (BTEX), as well as MTBE and other ethers. For example, MTBE has been detected in groundwater with high frequency in many states and there are well documented cases of impacts to municipal water supply wells. Due to the fact that MTBE and other ethers are characterized by the properties of high solubility in water, relatively low volatility compared to BTEX, relatively low carbon sorption coefficient, and poor biodegradability, the ethers are more easily transported in groundwater aquifers than BTEX and do not degrade through natural attenuation. While MTBE can be removed from recovered groundwater by treatment with granular activated carbon beds (GAC), it is relatively expensive compared to the treatment of BTEX because the GAC beds are subject to frequent exhaustion. Equally important, GAC is not effective at all on TBA that is found along with MTBE in contaminated groundwater.

Where groundwater contaminated with BTEX, MTBE, and other ethers is treated using activated carbon there is a need in the art for a method which reduces the need for frequent changing of the carbon bed and which also addresses the problem of degrading tertiary butyl alcohol.

In situ methods for the removal of contaminants from ground water are known. U.S. Pat. No. 5,277,518 discloses a method of in situ removal of contaminants from soil or from ground water, the method comprising the steps of establishing in situ at least one venting well comprising gas-permeable openings at an upper portion thereof and a condensate drain at a lower end thereof and removing volatile contaminants in the ground water or soil through the venting well. This reference contemplates injecting microorganisms, nutrients for the microorganisms, and oxygen. U.S. Pat. No. 5,472,294, to the same assignee, and U.S. Pat. No. 5,653,288, to the inventors of '518 and '294, provide improvements, including providing an oxygen-containing substance to the contaminants and enhancing lateral dispersion of injected materials.

U.S. Pat. No. 5,037,240 discloses a method of 'in situ' collection and treatment of floating, sinking and dissolved contaminants in a soil environment which involves installation of wick-like drains in at least a portion of the waste site on the down-gradient side of in-ground water flow. Some of the wick drains include porous or slotted pipes and are employed for the injection of treating chemicals or reagents into the contaminated soil for treatment in place prior to normal flow into the aquifer. Some of the drains may be employed for injection of bacteria or microbes, nutrients and/or air. U.S. Pat. No. 5,054,961, to the same assignee, discloses the added feature of forming an in-ground diversionary water barrier as a boom around at least the downstream area of said soil environment. These in situ methods do not discuss the use of carbon beds. U.S. Pat. No. 5,425,598 discloses an apparatus and method for sparging ground water by developing density driven convection and promoting the physical removal and biodegradation of contaminants.

In "Performance of Fixed Bed Reactors with Two-Phase Upflow and Downflow", Iliuta, Ion, *J. Chem. Tech. Biotechnol.* 1997, 68, 47–56, the performance of two-phase upflow and downflow fixed bed biofilm reactors, with the biocatalyst immobilized on the porous solid support was examined with the degradation of phenol selected as the test process.

Granular activated carbon (Hereafter GAC) has been used for treatment of water and wastewater at the surface. "Experiences with GAC-Fluid Bed for Bioremediation of BTEX-Contaminated Groundwaters", G. Mazewski, J. Tiffany & Hansen, Biotechnol. Ind. Waste Treat. Biorem., (Pub. 1996) 333–344(1992) relates information regarding a demonstration project and a full scale remediation project to treat groundwater from an operating recovery well at a bulk storage terminal using granular activated carbons. In this work the removal of BTEX was more satisfactory than the removal of other compounds such as MTBE.

In "Bioreactor Treatment of MTBE and TCE In Contaminated Ground Water", by Miller, Michael E., et al, from *In Situ and On-Site Bioremediation,* Pap. Int. In Situ On-Site Biorem. Symp., $4^{th}$ (1997),,Vol. 5, 89–94, the authors discuss a study at the Sparks Solvent/Fuel Site (Sparks, Nev.) where ground water containing MTBE, BTEX and various chlorinated solvents is treated in two granular activated carbon-fluidized bed bioreactors operating in parallel. For the first few weeks after reactor startup, 85% of the influent MTBE was removed, however effluent MTBE concentrations soon increased, indicating that the initial removal was predominately due to sorption and MTBE removal efficiencies dropped to 10–15%. Later carbon containing unidentified MTBE-degrading cultures was added to one of the fluidized bed bioreactors and the efficiency in that reactor increased to about 75%.

In "A Review of Potential Technologies for the Treatment of Methyl tertiary Butyl Ether (MTBE) in Drinking Water", discussing a study by Anthony Brown et al., University of Southern California Department of Civil and Environmental Engineering of the Metropolitan Water District of Southern California, City of Santa Monica, the authors mention the use of GAC, along with polymeric resins and chemically modified clays, but state at page 136 adsorbability is low on GAC, adsorption capacity for MTBE is low, and frequent GAC regeneration is required. (API-National Ground Water Association "Petroleum Hydrocarbons and Organic Chemicals in Ground Water: Prevention, Detection, and Remediation" Conference, Houston 11/12–14/1997)

The use of bacteria or naturally occurring microbes for biodegradation is known. U.S. Pat. No. 4,493,895 discloses microbial degradation of halogenated organic compounds. U.S. Pat. No. 5,641,679 discloses biodegradation of compounds such as naphthalene, haloaromatics, benzene, etc.

U.S. Pat. No. 5,474,934 discloses aerobic biodegradation of ethers using Amycolata sp. or a mutant. U.S. Pat. No. 5,814,514 discloses the use of propane-oxidizing bacteria for degrading an alkyl ether.

K. Mo, et al. *Appl. Microbiol. Biotechnol.* (1997) 47:69–72 proposes isolating from activated sludge and fruit of the gingko tree three pure cultures, belonging to the genuses Methylobacterium, Rhodococcus, and Arthrobacter, that are capable of degrading MTBE.

A microbe which is said to digest MTBE is described in a newspaper article by Steve Hart in *The Press Democrat*, Santa Rosa, Calif., 1 August (1999).

U.S. Pat. Nos. 5,750,364 and 5,902,734 to Salanitro, assigned to Shell Oil Co., disclose mixed bacterial cultures capable of biodegrading MTBE and TBA to carbon dioxide and water. U.S. Pat. No. 5,811,010 to Salanitro, assigned to Shell, discloses aerobic degradation of t-butyl alcohol using activated sludge. These three U.S. patents are incorporated herein by reference in the entirety.

It is apparent from the art that it is more difficult to degrade MTBE and other ethers than BTEX due to the properties of the ethers. The ethers have high solubility in water, relatively low volatility compared to BTEX, relatively low carbon sorption coefficient, poor biodegradability, and are more easily transported in groundwater aquifers than BTEX. MTBE can be removed from recovered groundwater by treatment with a GAC bed, but due to the fact it is not very hydrophobic and the capacity for sorption is not as high as BTEX, it is relatively expensive to remove by this method compared to BTEX due to frequent exhaustion of the activated carbon beds. In addition, activated carbon is not effective at all on TBA which is often found along with MTBE contaminated groundwater, and is even less hydrophobic.

There is a need in the art for a method of treating groundwater contaminated with these more recalcitrant chemicals. In addition, where an activated carbon is used to assist in degradation of MTBE, there is a need for a method that reduces the need for frequent replacement of the carbon beds. Furthermore, there is a need for a method that also provides for the degradation of TBA.

SUMMARY OF THE INVENTION

In accordance with the foregoing the present invention provides a method and apparatus for degrading oxygenate (s), including, but not limited to, ethers, alkyl ethers and alkyl alcohols, particularly branched alkyl ethers/alcohols, more particularly tertiary carbon atom-containing alkyl ethers/alcohols, and still more particularly MTBE and TBA, which reduces the need for the frequent replacement of activated carbon beds and, at the same time, allows for the removal of TBA where it would otherwise have not occurred. The invention comprises:

a) Inoculating a biodegrader capable of degrading said oxygenate on an activated carbon bed through a rigid tubular instrument having a plurality of holes around the circumference of the end used for inoculation of the carbon bed; and b) Flowing said groundwater, or other water stream contaminated with said oxygenate(s) through a structure having a top, bottom, and sides, and a predetermined volume containing said bed of activated carbon having said biodegrader inoculated thereon.

Also within the scope of the invention is supplying oxygen in the form of hydrogen peroxide and other nutrients to said bacteria.

In determining the amount of said biodegrader required to degrade said oxygenate(s) the following relationship is useful:

$$B = \frac{(0.1 - 10)(C_{in} - C_{out}) \cdot F}{A}$$

Where
B=dry mass of biomass degrader needed, (gm)
$G_{in}$=influent MTBE or other component influent, (mg/I)
$C_{out}$=desired effluent MTBE or other component, (mg/I)
F=flow rate of water to be treated, L/hr
A=degrader activity in mg of compound degraded/hr/gm of biomass

DETAILED DESCRIPTION OF THE INVENTION

The present invention (BioGAC) provides a method for the biodegradation of oxygenate(s) in, for example groundwater, by flowing contaminated fluids through fixed beds of granulated carbon inoculated with a MTBE-degrading microorganism. This method provides improved breakdown of MTBE, reduces the need for frequent replacement of activated carbon beds, and, in addition, provides for the removal of TBA. In references known in the art, where carbon beds alone are used, MTBE adsorption is expensive and TBA is not adsorbed at all.

The present invention provides a method for remediating oxygenate(s). Oxygenate(s) is a substance added to a hydrocarbon to increase the amount of oxygen present. Oxygenate (s) as described in the present invention are oxygen-containing hydrocarbons which include, for example, but are not limited to, ethers, alkyl ethers and alkyl alcohols, particularly branched alkyl ethers/alcohols, and more particularly tertiary carbon atom-containing alkyl ethers/alcohols. Still more particularly MTBE and TBA contaminants in soil and groundwater are degraded by flowing the contaminated material through a fixed bed of granulated carbon seeded with bacteria known to biodegrade said oxygenate(s) to carbon dioxide and water. Examples of oxygenate(s) degraded with the present invention include, but are not limited to, diethyl ether (DEE), dimethyl ether (DME), methyl ethyl ether (MEE), methyl n-propyl ether (MPE), ethyl n-propyl ether, methyl isopropyl ether, ethyl isopropyl ether, di-t-butyl ether, di-isopropyl ether (DIPE), di-isobutyl ether, isopropyl isobutyl ether, ethyl t-butyl ether (ETBE), t-amyl ethyl ether, t-amyl propyl ether, t-amyl isobutyl ether or methyl-t-amyl ether.

A wide variety of reactors known in the art would be suitable for use with BioGAC. Suitable reactors include column or drum, alone or in a series. In Example 1, described herein, a 55-gallon carbon drum was used to demonstrate the invention, however vessels containing 200 lbs. of carbon or more are within the scope of the invention. The reactor is fitted with piping to provide nutrients and an oxygen source. The reactor is preferably also fitted with a gauge to monitor pressure and an air vent to relieve any build-up of process gases.

A wide range of granular activated carbon size particles are suitable for use in the activated carbon bed of the BioGAC. Mesh size is not critical, however it is believed that carbon particles smaller than 50 mesh (U.S. Standard sieve) might not be as satisfactory, because a bed of such particles tends to plug with solids. Suitable granular activated carbons that are available commercially include, but are not limited to, Calgon Filtrasorb 600, Barnebey Sutcliffe Coconut Shell carbon, and USF Westates CC-602. A suitable granular activated carbon which was used to demonstrate the invention is USF Weststates CC-602 Carbon. This grade was selected as best meeting the objective of minimum plugging.

Critical elements of the present invention include: 1) Biodegrader bacteria that have the ability to degrade oxygenate(s), including alkyl ethers and alkyl alcohols, particularly branched alkyl ethers/alcohols, and more particularly MTBE and TBA, down to carbon dioxide and water; and 2) The method of inoculating the GAC with the biodegrader in the optimum manner to accomplish biodegradation and avoid plugging of the GAC, employing a specially designed rigid tubular instrument for inoculation. Also disclosed is a method of determining the amount of biodegrader needed by using the relationship of volume of the bed (V), activity of the biodegrader (A), concentration of oxygenate(s) in influent ($C_{in}$), and concentration of oxygenate(s) in the effluent to derive (B), the dry mass of the biodegrader needed to degrade the oxygenate(s), for example MTBE, in the water stream.

Biodegrader

Biodegraders suitable for use in the present invention are bacteria capable of biodegradation of an oxygenate or a plurality of oxygenates. The term "oxygenate(s)" are oxygen containing hydrocarbons which include alkyl ethers and alkyl alcohols, particularly branched alkyl ethers/alcohols, and more particularly MTBE and TBA. The term biodegrader includes, but is not limited to mixed bacterial cultures, isolated mixed bacterial cultures, pure (single cell) bacterial cultures, derivatives of mixed or pure bacterial cultures, and the like. Examples include the mixed cultures described in U.S. Pat. No. 5,750,364, U.S. Pat. No. 5,811,010, and U.S. Pat. No. 5,902,734, t o Salanitro, assigned to Shell, and incorporated herein by reference in the entirety. Also particularly well suited is the pure (single cell) bacterial culture described in copending U.S. patent application Ser. Nos. 09/292037, 09/438595, and 09/439905, assigned to Shell and incorporated by reference herein in the entirety.

Following is a brief description of the isolated mixed culture, having the identifying characteristics of BC-1, ATCC No. 202057, which is described in detail in U.S. Pat. No. 5,750,364. BC-1 aerobically degrades MTBE, added to the culture at a concentration of 0.01 to 500 ppm, to carbon dioxide, and also degrades tertiary butyl alcohol. BC-1 also degrades other tertiary carbon-containing ether compounds. The BC-1 mixed culture is prepared by adding a branched alkyl ether to biosludge (activated sludge), incubating for a period of time, adding mineral nutrient, and enriching the culture by adding a suitable amount of branched alkyl ether.

The pure culture described in copending U.S. patent application Ser. Nos. 09/439905, 09/292037, and 09/438595 belongs to the family Actinomycetes and the species Rhodococcus and can be isolated from BC-1 or any other mixed culture, having the identifying characteristics of being able to degrade aerobically MTBE added to the culture at a concentration of 0.01 to 500 ppm, to carbon dioxide. One non-limiting example of the preparation of a pure culture includes the preparation of a mixed culture using the method described in U.S. Pat. No. 5,750,364. Then the pure culture is prepared by adding, for example, about 10 ml of the mixed culture to about 10 ml of sterile Difco Bushnell-Haas ($MgSO_4$, 200 mg/L; $CaCl_2$, 20 mg/L; $KH_2PO_4$, 1000 mg/L; $K_2HPO_4$ 1000 mg/L; $NH_4NO_3$ 1000 mg/L; $FeCl_3$, 50 mg/L, pH 7.0) mineral medium (3.5 g/L; referred to as BH) in stoppered serum bottles containing 1–5 mg/L MTBE. At weekly intervals, half of the culture volume (10 ml) is aseptically removed and 10 ml fresh sterile BH medium added to the remaining 10 ml of culture. The dilution enrichment method is continued for at least 2–3 months at 25° C. until a dilute suspension of bacteria degrading MTBE consistently degrade MTBE before each transfer interval. This dilution enrichment culture is subsequently streaked onto sterile Petri plates containing BH minerals plus 1.5% Difco Agar as a solidifying agent. Plates were incubated at 25° C. or 30° C. and observed for the appearance of colonies after 3–5 days. Approximately 20 colonies are picked with sterile needles and inoculated into 20 serum vials containing sterile BH medium and 1–10 mg/L MTBE. These cultures are incubated at 25–30° C. and the loss of MTBE from the headspace of serum vials is determined. One isolate, identified as SC-100, completely degraded MTBE without any significant appearance of intermediates such as t-butyl alcohol.

SC-100 also degrades other ether oxygenates besides MTBE, such as, for example, TAME, ETBE, DIPE, and TBA. A BC-1 mixed bacterial culture in a concentration of 0.3 g/L can degrade MTBE at 5, 8, 15, and 35 ppm in 2, 3, 6, and 10 hours respectively. The pure bacterial culture SC-100, for example, at a concentration of 2.4 g/L (glucose-grown) degrades MTBE at 10, 20, 40, and 80 ppm in 18–24 hours. Large scale amounts, for example, hundreds of Kg of the enriched mixed cultures of this invention with high specific MTBE removal activity (10–30 mg/g/h) can be readily obtained from Shell Global Solutions, Houston, Tex., U.S.A., for seeding GAC beds of any size.

As used herein, derivatives of mixed or pure bacterial cultures include any compositions derived from said mixed or pure bacterial cultures. Examples of the compositions derived from the pure bacterial culture include, but are not limited to, members of, fragments of the bacterial culture, membrane fragments of bacterial culture, enzymes extracted and/or isolated from the bacterial culture, lyophilized and/or dried culture, lyophilized and/or dried fragments of culture, lyophilized and/or dried enzymes derived from said culture, bacterial culture and/or fragments thereof and/or enzymes derived therefrom bound to a carrier and/or binder and/or fixed bed, etc. Any method known to one skilled in art for making composition derived from a culture including but not limited to extraction or fragmentation to obtain active ingredients/fragments thereof is within the scope of the present invention.

Method of Determining Amount of Biodegrader to be Employed

As mentioned, an important aspect of the present invention is the amount of bio-degrader or bacteria to use, and a critical element of the invention is the method of seeding in order to prevent plugging of the GAC. The amount of biodegrader needed to treat a given amount of MTBE can be determined by analysis of the relationship represented by:

$$B = \frac{(0.1 - 10)(C_{in} - C_{out}) \cdot F}{A}$$

More specifically, $$B = \frac{(0.5 - 5)(C_{in} - C_{out}) \cdot F}{A}$$

Still more specifically, $$B = \frac{(0.8 - 2)(C_{in} - C_{out}) \cdot F}{A}$$

Where

B=dry mass of biodegrader needed, (gm)

$C_{in}$=concentration of oxygenate(s) or MTBE in the influent, (mg/l)

$C_{out}$=desired concentration of oxygenate(s) or MTBE in the effluent (mg/l)

F=flow rate of water to be treated, l/hr

A=biodegrader activity in mg of compound degraded/hr/gm of biomass

V=volume of the empty carbon bed, Liters

A should be higher than 2, preferably higher than 8. The ratio of volume to flow rate (V/F) should be greater than 0.05 h., preferably greater than 0.5 h and more preferably greater than 1 h.

Calculations of a suitable amount of biodegrader are based on dry weight of the degrader or bacteria culture.

Generally we have found that an amount of biodegrader anywhere from 100 mg to 5000 mg can work, however a more suitable amount is from about 500 mg to 2500 mg (dry basis) per Kg of granular activated carbon (dry basis) in the bed. A typical amount used to demonstrate the invention was 1000 mg (dry basis) of our mixed culture per Kg of granular activated carbon (dry basis) in the bed. Significantly more than this can lead to plugging or channeling while less than this lengthens the start-up period due to inadequate establishment of colonies of the desired biodegrader.

As another embodiment of the present invention, the flow rate can be determined by the following:

$$F = \frac{A \cdot B}{(0.1 - 10)(C_{in} - C_{out})}$$

As an illustrative example where the values are as follows:

A=biodegrader activity is assessed to be 5 mg/g/hr

B=dry mass of biodegrader needed is 181 gm $C_{in}$=concentration of MTBE in the influent is 2 ppm $C_{out}$=desired concentration of MTBE in the effluent is <10 ppb $$F = \frac{A \cdot B}{(0.1 - 10)(C_{in} - C_{out})}$$

$$F = \frac{5 \text{ mg/L/hr} \cdot 181 \text{ gm}}{(0.1 - 10)(2 \text{ ppm} - <10 \text{ ppb})}$$

$$F = (0.1 - 10) 454 \text{ l/hr}$$

As another embodiment of the present invention the biodegrader activity in mg of compound degraded/hr/gm of biomass can be determined by the following:

$$A = \frac{(0.1 - 10)(C_{in} - C_{out}) \cdot F}{B}$$

As an illustrative example where the values are as follows:

$C_{in}$=concentration of MTBE in the influent is 2 ppm $C_{out}$=desired concentration of MTBE in the effluent <10 ppb F=flow rate of water to be treated is 454 l/hr B=dry mass of biodegrader needed is 181 gm $$A = \frac{(0.1 - 10)(C_{in} - C_{out}) \cdot F}{B}$$

$$A = \frac{(0.1 - 10)(2 \text{ ppm} - <10 \text{ ppb}) \cdot 454 \text{ l/hr}}{181 \text{ gm}}$$

$$A = (0.1 - 10) \times 5 \text{ mg/gm/hr}$$

Inoculation Method and Apparatus

As mentioned a critical element of this invention is the method of inoculation. In seeding the GAC bed, it is important that the biodegrader be dispersed evenly in the carbon bed. Uneven distribution results in plugging and bypassing of some parts of the bed.

Figure 1:
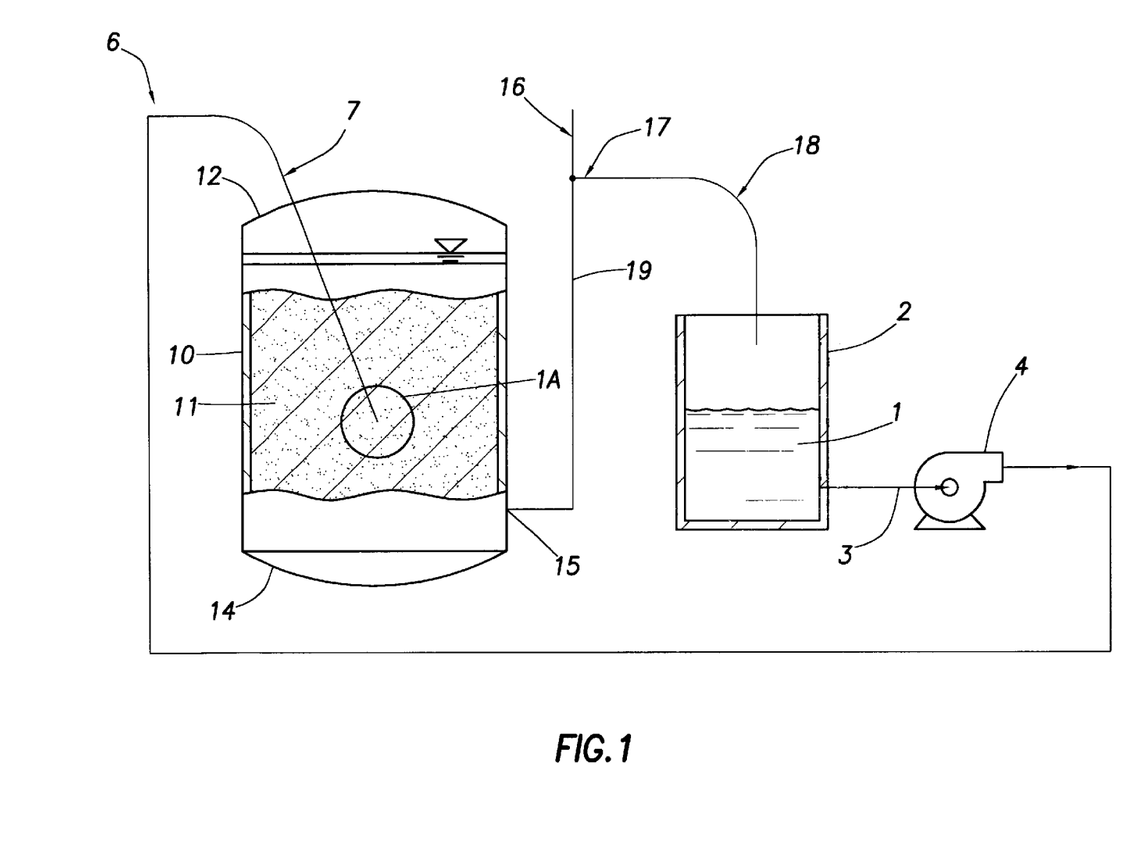
FIG. 1 is a diagram of the GAC inoculation equipment and procedure.

FIG. 1 is a diagram of the GAC inoculation equipment. The size of the equipment can vary and may range from laboratory scale to commercial scale as will be apparent to those skilled in the art. The biomass 1 is held in a circulation tank 2. The tank is connected to a pump 4 by line 3. The pump is connected to the BioGAC reactor by a flexible hose or line 6. The flexible hose is connected to rigid tubing, or inoculation "wand", 7 which is inserted into the BioGAC reactor 10 and into the carbon bed 11. The last section, about six inches, of the end of the rigid tubing is shown in the enlargement FIG. 1A. The end of the rigid tubing contains holes, represented by 9, through which the biomass exits and enters the carbon bed 11. The end of the rigid tubing can be fitted with a plug that can be opened or closed during loading operations depending on conditions. 19 represents a rigid plastic pipe open to the atmosphere and 17 represents a tee. Groundwater is fed into the BioGAC reactor through the groundwater feed line 19.

Still referring to FIG. 1, in the method used for inoculating or loading biomass onto a BioGAC bed, the inlet 3 to the pump is connected to the circulation tank which holds the biomass to be loaded. The biomass in the tank is diluted with water, typically groundwater. The MTBE degrader should be diluted to prevent localized bed plugging. Suitable biomass concentration after dilution is in the range of 100 mg/L to 5000 mg/L, with a preferred range being 500 mg/L to 3000 mg/L, and a concentration after dilution of less than 2000 mg/l working very satisfactorily.

The diluted biomass is pumped from the tank 2 through the flexible tubing 6 to the rigid tubing 7 and through the holes in the end of the tube 9 at a high velocity and enters the GAC bed. The high velocity of fluid leaving the tubing causes the carbon bed in the immediate vicinity of the end of the rigid tubing to "fluidize", which provides good local mixing and makes it easy to push the rigid tubing through the GAC bed. While the diluted biomass is being pumped through the tube, the tube itself is continually moved around the GAC bed to give an even distribution of the biomass.

As the biomass is being pumped into the GAC bed, the water level will rise somewhat in the GAC vessel giving rise to a liquid head which forces water out the bottom of the GAC vessel 15. The outlet of the GAC vessel 15 is connected to a vertical piece of rigid pipe 19 with a tee 17 just slightly above the level of the top of the GAC bed. The height of this tee will determine the liquid height above the GAC bed. The straight-through portion of the tee is connected to a short piece of vertical pipe open to the atmosphere 16 which serves as a vacuum breaker. The middle part of the tee is connected to a flexible hose 18 which goes to the tank containing the diluted biomass. In this way, the water carrying the biomass onto the bed is returned to the tank while the biomass is retained on the bed through filtration by the carbon particles.

As the seeding of the bed takes place, the biomass content in the tank will gradually decrease and the water in the tank will become clearer. Depending upon the total amount of biomass to be loaded, several cycles may be required, each cycle comprising placing a fixed amount of biomass in the tank, diluting it by adding water to the tank, and loading the biomass onto the GAC bed as described above until there is not much biomass left in the tank, indicated by the increasing clarity of the water in the tank.

The inoculation process is finished when the biomass or biodegrader concentration in the feed tank is reduced to clean water levels. This may take up to 8 hours, more often up to 4 hours.

The amount of biodegrader to load must be enough to develop a biodegrading culture on the carbon within a short time period, say less than 90 days, preferably 30 to 60 days, however the amount should not be so much that it causes plugging of the bed and/or channeling. Plugging of the bed prevents fluid flow through the bed, and necessitates the GAC be backwashed or the carbon replaced, removing the biodegrader from the system and losing time in either case. Where channeling occurs in the bed, fluid can still flow, but the actual detention time of the fluid in the bed is much less than the design the invention provides for, resulting in poor, if any, MTBE removal.

The amount of MTBE biodegraders that a GAC bed can handle is partly dependent on the head loss characteristics of the interaction between the carbon particles and the biodegrader particles added and on the allowable pressure within the GAC vessel.

The rigid tubing 7, or inoculation "wand", in FIG. 1 is an instrument for inoculating the biodegrader in the GAC that is a key part of the present invention. As discussed above poor dispersion of the biodegrader when seeding the GAC bed results in poor removal of MTBE. The inoculation instrument disclosed herein is generally a rigid tube, connected to the flexible hose bringing biomass from the storage tank by way of the pump, said rigid tubing having a diameter appropriate to the scale of the other equipment, generally in the range of ½ in. to 2 in., preferably about ½ in. to 1 inch, having a series of small holes drilled in the last section of the bottom edge, generally the last 5 to 10 inches of the end inserted in the GAC.(See FIG. 1A)

The rigid tubing can be made of any rigid material. Suitable metals would include copper and steel. Rigid plastic tubing is also acceptable. Particularly suitable is stainless steel.

Figure 1A:
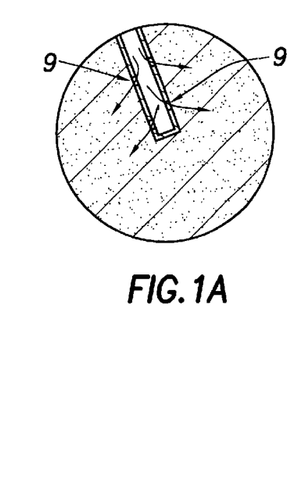
FIG. 1A is an enlarged view showing the end of the inoculation wand.

In one nonlimiting embodiment of the invention, using equipment as generally described in FIG. 1 and 1A, the rigid tubular instrument for loading biomass was a piece of rigid stainless steel tubing about ¾ in. diameter connected on one end via flexible tubing to the outlet of a pump and having a series of small holes drilled in the other end. About four to six ¼ in. holes in the last 6 inches of steel tubing accomplished the desired objectives. The inlet to the pump is connected to a small circulation tank (~30–50 gal) which holds the biomass to be loaded onto the GAC bed. The biomass in the tank is diluted with water (typically site groundwater) so the biomass (TSS) concentration does not exceed 2000 mg/L. The diluted biomass is pumped from the tank and through the rigid tubing at a rate of about 5 to 15 gpm. The end of the rigid tube with the holes is placed in the GAC bed through the opening at the top of the GAC vessel. The diluted biomass liquid exits the rigid tubing through the holes in the end of the tube at a high velocity and enters the GAC bed. The high velocity of fluid leaving the tubing causes the carbon bed in the immediate vicinity of the end of the rigid tubing to "fluidize", which provides good localized mixing and makes it easy to push the rigid tubing through the GAC bed. While the diluted biomass is being pumped through the tube, the tube itself is continually moved around the GAC bed to give even distribution of the biomass.

In an alternative embodiment, the GAC bed can be fluidized through the backwash of the bed. The degree of bed expansion required depends on the MTBE degrader particle size distribution, with small discrete particles requiring less bed expansion. Generally the required bed expansion will probably be in the range of 2% to 30%, but more often in the range of 5% to 15%.

Nutrients

As with any aerobic biotreatment system, the biodegrader on the GAC bed needs oxygen to survive and degrade MTBE. There is sometimes some residual oxygen in the recovered groundwater, depending on the type of recovery well and pump, but the dissolved oxygen level is often inconsistent and not always high enough to meet the biodegrader requirements.

In the present invention it has been found preferable to provide any additional oxygen in the form of hydrogen peroxide rather than as air or oxygen. If additional oxygen is needed, it is provided by pumping a solution of hydrogen peroxide into the groundwater feed line to the GAC bed. The amount of hydrogen peroxide required is determined from the amount of biodegradable oxygen demand in the water. A precision metering pump (typically a piston or diaphragm pump) is used to pump the hydrogen peroxide.

The hydrogen peroxide is typically used diluted to a concentration in the range of 5% to 30%, preferably about 15% to 25%, most preferably about 20%.

A minimum amount of hydrogen peroxide solution is from about 6 to 9 weight units of $H_2O_2$ per weight units of MTBE or other oxygenate. A preferred amount is about 10 weight units.

For groundwater containing only MTBE and TBA, the concentration of biodegradable oxygen demand is just the concentration of MTBE times 2.73 plus the concentration of TBA times 2.59. The biodegradable oxygen demand is then multiplied by the recovered groundwater flow rate to determine the required oxygen concentration. The residual oxygen dissolved concentration is subtracted from this number and the resulting number is then divided by 0.47 to determine the required mass flow rate of hydrogen peroxide. Using the density and concentration (typically 20%) of the hydrogen peroxide solution, the required volumetric flow rate of the hydrogen peroxide solution can then be calculated.

In addition to oxygen the biodegrader requires nutrients to achieve effective biodegradation. Major nutrients are nitrogen- and phosphorus-containing compounds and they must be provided to the biodegrader on the GAC bed to achieve effective survival of the culture and biodegradation of MTBE. Compounds providing major nutrients include, but are not limited to, $NaNO_3$, $NH_4Cl$, and $KH_2PO_4$. The nutrients used to demonstrate the invention are sodium nitrate and sodium phosphate monobasic. A suitable amount of nitrate-N or ammonia-N nitrogen source is about 0.03 to 0.14 wt units nitrate or ammonia-N to wt units of MTBE, preferably about 0.05 to 0.10 and, in most cases close to 0.07 wt units of nitrate-N or ammonia-N to wt unit of MTBE. A suitable amount of phosphorus or phosphate containing compound is about 0.005 to 0.03 wt units phosphate-P to wt units of MTBE, preferably about 0.01 to 0.02, and in most cases close to about 0.015 wt units of phosphorus or phosphate to wt units of MTBE.

In a nonlimiting illustrative example a concentrated solution containing sodium nitrate (~20 g/L) and sodium phosphate monobasic (~2.5 g/L) is pumped into the groundwater feed line to the GAC bed. This can be pumped in separately from the hydrogen peroxide, or a combined solution containing the hydrogen peroxide along with the nutrient compounds can be utilized, thus reducing the requirement from two to one metering pump. If the nutrients are combined with the hydrogen peroxide, the concentration of hydrogen peroxide and nutrients should be adjusted to give a weight ratio of hydrogen peroxide to N to P of 10 to 0.07 to 0.015.

Environmental temperature and pH do have an effect on the biodegrader or bacteria's rate of organic degradation. Although the range is not critical, a temperature range between about 10 and 30° C., preferably about 19–25° C., is most conducive to the degradation process. With respect to pH, it is preferred that the pH be in the range of 6.0 to 9.0, preferably 6.5 to 8.5, and most preferably between 7.0 and 8.0.

The following examples will serve to illustrate the invention disclosed herein. The examples are intended only as a means of illustration and should not be construed as limiting the scope of the invention in any way. Those skilled in the art will recognize many variations that may be made without departing from the spirit of the disclosed invention.

EXAMPLE 1

Example 1 describes the start-up, operation and results of a 55-gallon activated carbon drum pilot plant unit. Loading of the 55-gallon carbon drum was accomplished by injecting the microorganisms into the carbon drum through a 4-foot, ¾ inch (OD) SS tube wand. The lower 6 inches of the wand was perforated with ~3/16 inch holes around the circumference. A plug was fitted to the end of the tubing that could be opened or closed depending on the conditions during loading operations. The drum lid was removed and the bacteria were pumped through the wand at about 6–8 gpm. Concentration of the bacteria injected was in general between 1500–2000 mg/L TSS. Higher or lower microorganism TSS concentrations may be used depending on conditions of the carbon environment. The wand is moved up/down and around the circumference of the carbon bed to ensure maximum dispersion of the organisms throughout the bed. Periodically the resultant overflow of liquid is recycled to the inoculation feed tank until the overflow is clear. After the desired loading (mg TSS microorganism/Kg dry carbon) is achieved (generally 2500 mg/Kg) with a clear effluent overflow, the inoculation process is complete. The drum lid is then secured and the operation of the unit begins.

The drum is fitted with the necessary piping to facilitate down-flow of pumped organic/nutrient/oxygen enriched feed solution through the carbon bed. The drum is also fitted with a gauge to monitor pressure and an air vent to relieve any build-up of process gases. The feed is comprised of about 2 PPM MTBE and 0.5 PPM TBA, a nitrogen/phosphorus salt solution and a hydrogen peroxide solution that is pre-mixed together in a separate feed tank before being introduced to the carbon bed.

Once the carbon drum has been inoculated, the feed is introduced to the unit at 2 gpm. At this size carbon drum and feed concentration and flow, the following was monitored and adjusted to maintain the following conditions:

a. Dissolved oxygen concentration exiting the unit was greater than or equal to ~1–2 PPM by adjusting the hydrogen peroxide concentration in the feed.

b. Nitrogen and phosphorus concentrations were maintained at ~1.5 and 0.3 mg/L, respectively.

c. It should be noted that the environmental temperature and pH have an effect on the microorganism's rate of organic degradation. Temperature and pH were not regulated during these pilot plant operations; however, the feed solution (primarily industrial WTC plant water) was about 19–25° C. and the pH remained between 7.0 and 8.0 during these experiments.

On day 1, Unit S2A was inoculated with 216 grams (dry wt.) of mixed culture MTBE degrading bacteria. Since that time until 160 days later, no changes have been made to the unit feed and no additional bacteria have been added.

Once the mixed culture was in place for approximately 100 days from addition at day 1, we have consistently demonstrated the reduction of influent MTBE/TBA concentrations from 2 PPM MTBE and 0.5 PPM TBA to 1 PPB and 5 PPB, respectively. The unit pressure has risen from about 1 to 6 psig.

Figure 2A:
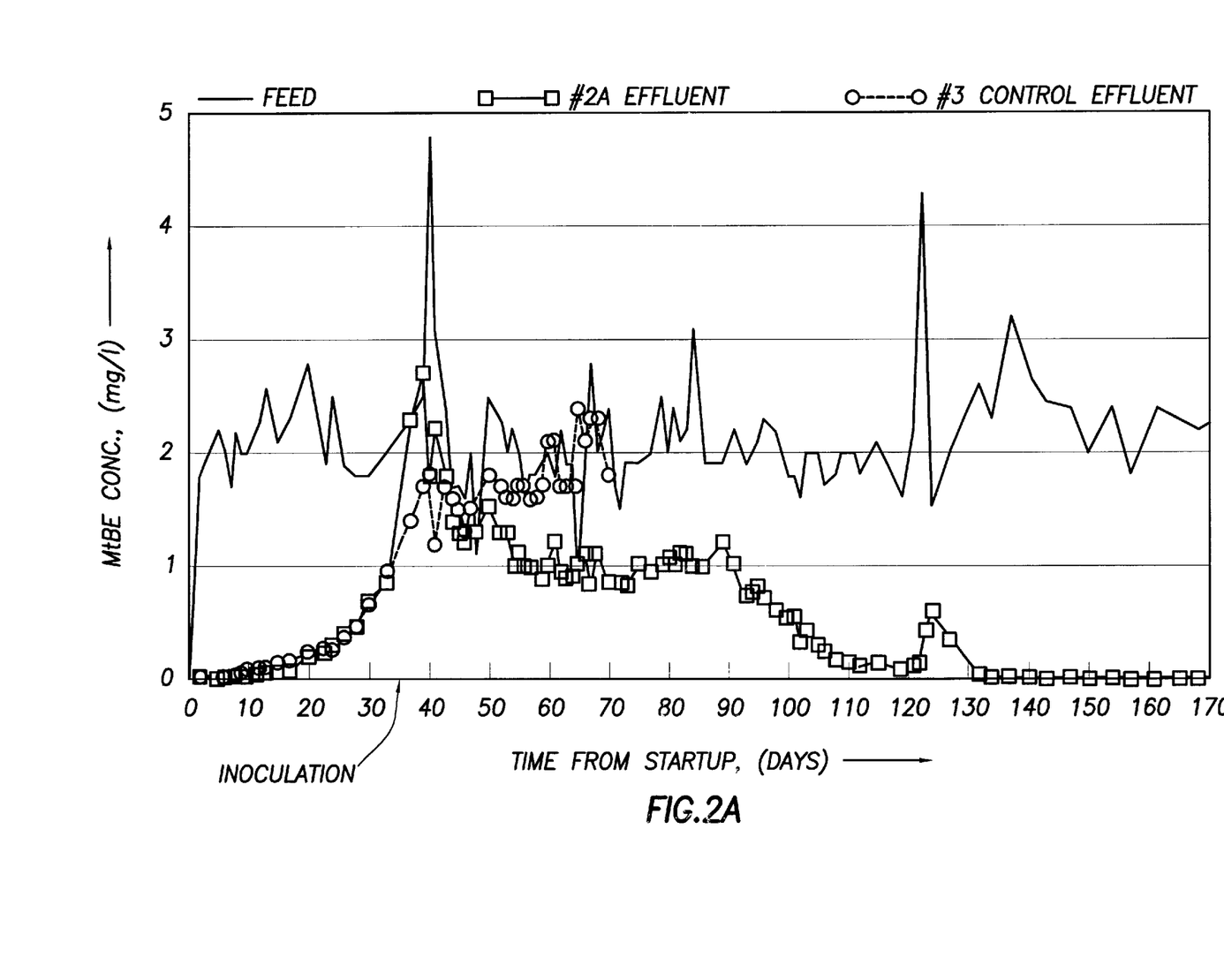
FIG. 2A is a graph showing the influent and effluent levels of MTBE and the performance of the BioGAC.
Figure 2B:
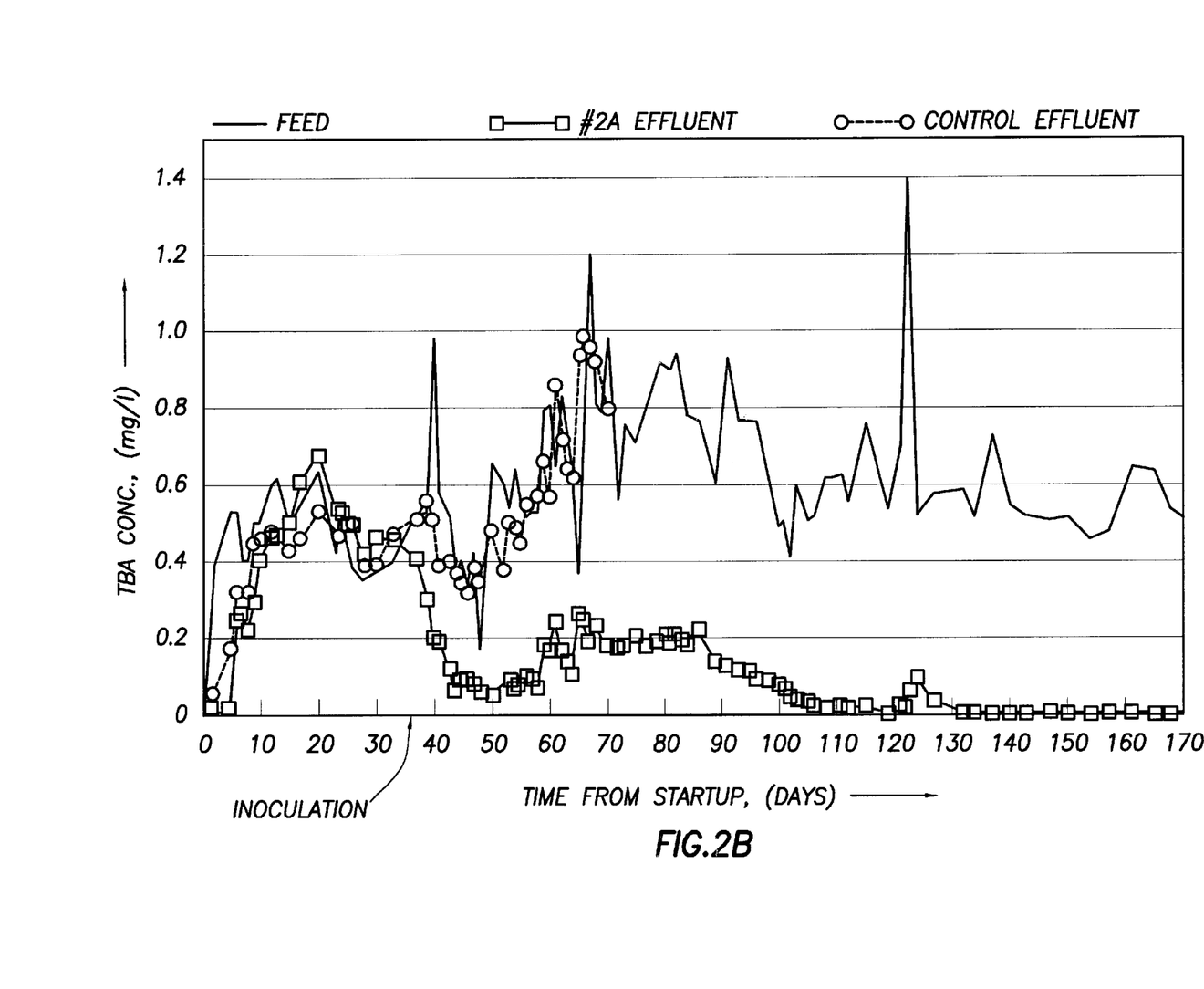
FIG. 2B is a graph showing the influent and effluent levels of TBA and the performance of the BioGAC.

FIG. 2A is a graph of the influent and effluent MTBE, showing the performance of the BioGAC reactor. FIG. 2B shows influent and effluent TBA.

Within 30 days the effluent MTBE decreased to 1 ppm and within 100 days to <10 ppb.

EXAMPLE 2

Example 2 is one illustrative but not restrictive example of using the formula of the present invention to determine the amount of biomass to use in inoculating the GAC. The equipment for this example would be as described in FIG. 1. The $C_{in}$ of influent MTBE was 2 ppm. Desired $C_{out}$ of effluent MTBE was <10 ppb. The flow rate of the groundwater to be treated was F=4541 l/hr.

The degrader activity (A) of the biomass to be employed was assessed to be about 5 mg/g/hr. The amount of degrader needed was determined using the formula:

$$B = \frac{(0.1-10)(C_{in} - C_{out}) \cdot F}{A}$$

$$B = \frac{(0.1-10)(2 \text{ ppm} - <10 \text{ ppb}) \cdot 454 \text{ l/hr}}{5 \text{ mg/g/hr}}$$

$$B = (0.1-10) \times 181 \text{ gm(dry mass of degrader needed)}$$

We claim:

1. A method of treating groundwater, or other water stream contaminated with an oxygenate to degrade said oxygenate which comprises:
   a) Inoculating a biodegrader capable of degrading said oxygenate on an activated carbon bed through a rigid tubular instrument having a plurality of holes around the circumference of the end used for inoculation of the carbon bed; and
   b) Flowing said groundwater, or other water stream contaminated with said oxygenate through a structure having a top, bottom and sides and a predetermined volume containing said bed of activated carbon having said biodegrader inoculated thereon.

2. The method according to claim 1 further comprising said structure has an inlet port through which an influent liquid stream containing said oxygenate enters said structure; and an outlet port through which an effluent liquid stream containing degraded oxygenate exits.

3. The method according to claim 2 further comprising:
   Flowing said groundwater or other water stream contaminated with oxygenate(s) at a flow rate (F) through said structure having a predetermined volume (V) containing a bed of activated carbon, wherein the concentration of contaminant in influent is represented by ($C_{in}$); the concentration of said oxygenate in effluent is represented by ($C_{out}$); the biodegrader has a dry mass (B), and activity (A), and wherein A, B, F, $C_{in}$ and $C_{out}$ have the following relationship:

$$B = \frac{(0.1-10)(C_{in} - C_{out}) \cdot F}{A}$$

Where
B=dry mass of biodegrader needed to degrade oxygenate(s), (gm)
$C_{in}$=concentration of oxygenate(s) in the influent (mg/l)
$C_{out}$=desired concentration of oxygenate(s) in the effluent (mg/l)
F=flow rate of water to be treated, L/hr
A=biodegrader activity in mg of compound degraded/hr/gm of biomass.

4. The method according to claim 3 further comprising means for controlling the flow of influent.

5. The method according to claim 4 further comprising the ratio of volume to flow rate (V/F) is greater than 0.05 h.

6. The method according to claim 5 wherein the ratio of volume to flow rate (V/F) is greater than 1 h.

7. The method according to claim 2 further comprising said outlet of said structure is connected to a vertical piece of rigid pipe with a tee just slightly above the level of the top of the granular activated carbon bed.

8. The method according to claim 7 further comprising the straight through portion of the tee is connected to a short piece of vertical pipe open to the atmosphere that serves as a vacuum breaker.

9. The method according to claim 7 further comprising the middle part of the tee is connected to a flexible hose, which goes to a holding tank containing biodegrader.

10. The method according to claim 9 further comprising the water carrying the biodegrader onto the GAC bed is returned to the holding tank while the biodegrader is retained on the bed through filtration by carbon particles in the bed.

11. The method according to claim 2 further comprising the biodegrader requires an oxygen source.

12. The method according to claim 11 wherein the amount of oxygen required is determined from the amount of biodegradable oxygen demand in the water.

13. The method of claim 12 wherein the water contains only MTBE and TBA and the concentration of biodegradable oxygen demand is =[MTBE]×2.73+[TBA]×2.59.

14. The method of claim 13 further comprising the biodegradable oxygen demand is multiplied by a recovered groundwater flow rate to determine the required mass of oxygen.

15. The method according to claim 11 further comprising means for supplying oxygen as hydrogen peroxide.

16. The method according to claim 15 further comprising the oxygenate(s) comprises predominantly MTBE.

17. The method according to claim 16 further comprising the amount of hydrogen peroxide added is greater than 6 wt units of hydrogen peroxide per weight unit of MTBE.

18. The method according to claim 17 further comprising the amount of hydrogen peroxide added is greater than 9 wt units of hydrogen peroxide per weight unit of MTBE.

19. The method according to claim 15 further comprising the hydrogen peroxide is added in a concentration of about 10% to 30%.

20. The method according to claim 19 wherein the hydrogen peroxide is added in a concentration of about 15% to 25%.

21. The method of claim 15 further comprising the required mass flow rate of a hydrogen peroxide is determined by subtracting the residual oxygen dissolved concentration from the required mass of oxygen and dividing by 0.47.

22. The method according to claim 2 further comprising means for supplying suitable nutrients to the biodegrader bacteria.

23. The method of claim 22 wherein the nutrient is at least one nutrient selected from the group consisting of elemental nitrogen or compounds thereof and elemental phosphorous or compounds thereof.

24. The method of claim 23 wherein the nutrient is one or more nutrients selected from the group consisting of $NaNO_3$, $NH_4Cl$, and $KH_2PO_4$.

25. The method of claim 24 wherein the nutrient is selected from sodium nitrate and sodium phosphate monobasic.

26. The method according to claim 22 further comprising the means for supplying nutrients is combined with a means for supplying oxygen.

27. The method according to claim 22 wherein the means for supplying nutrients is separate from a means for supplying oxygen.

28. The method according to claim 22 further comprising the amount of nutrient required is determined from the amount of biodegradable oxygen demand in the water.

29. The method according to claim 28 wherein the water contains only oxygenate(s) MTBE and TBA and the concentration of biodegradable oxygen demand is =[MTBE]×2.73+[TBA]×2.59.

30. The method of claim 29 further comprising the biodegradable oxygen demand is multiplied by a recovered groundwater flow rate to determine the required mass of oxygen.

31. The method of claim 20 wherein said nutrients comprise nitrogen and phosphate and further comprising the required mass flow rate of nutrient is determined by multiplying the required mass of oxygen by 0.025 for N and 0.005 for P.

32. The method according to claim 1 further comprising during inoculation said structure is in communication with a holding tank where the biodegrader is stored.

33. The method according to claim 32 wherein said communication between the holding tank and structure containing the activated carbon bed comprises a flexible tube exiting said holding tank which connects to said rigid tubular instrument that enters the carbon bed for inoculation.

34. The method according to claim 33 further comprising the rigid tubular instrument is a size and diameter appropriate for the dimensions of the structure containing the carbon bed and of the holding tank.

35. The method according to claim 34 wherein the rigid tubular instrument is a rigid plastic.

36. The method according to claim 34 wherein said rigid tubular instrument is a metal.

37. The method according to claim 36 wherein the rigid tubular instrument is stainless steel.

38. The method according to claim 34 wherein said rigid tubular instrument has an overall diameter of from ½ in. to 2 in.

39. The method according to claim 34 wherein said rigid tubular instrument is about 1 ft. to 6 ft. in length, from the connection to said flexible tubing to the end having the holes.

40. The method according to claim 34 further comprising the rigid tubular instrument is stainless steel, about 4 ft. long with an overall diameter of about ¾ in., and having about 4 to 6 holes of a diameter of about 3/16 to ¼ in. drilled in about the last six inches.

41. The method according to claim 33 further comprising there is a pump between said holding tank and flexible tube and the biodegrader is pumped through the flexible tubing and rigid tubular instrument and through holes in the end of the rigid tubular instrument.

42. The method according to claim 41 further comprising said biodegrader is diluted with liquid selected from groundwater or other source of water.

43. The method according to claim 42 wherein the biodegrader concentration after dilution is in the range of 500 mg/L to 3000 mg/L.

44. The method according to claim 43 wherein the biodegrader concentration after dilution is less than 2000 mg/l.

45. The method according to claim 41 wherein the biodegrader is pumped at a rate of about 2 to 20 gpm.

46. The method according to claim 45 wherein the biodegrader is pumped at a rate of about 5 to 15 gpm.

47. The method according to claim 41 further comprising the biodegrader exits the holes at high velocity, and the high velocity of fluid leaving the tubing causes "fluidization" of the carbon bed in the immediate vicinity of the end of the rigid tubing, which provides good local mixing and makes it easy to push the rigid tubing through the GAC bed.

48. The method according to claim 47 further comprising while the biodegrader is being pumped through the tubular instrument, the tubular instrument itself is continually moved around to provide even distribution of the biodegrader.

49. The method according to claim 47 further comprising fluidizing the GAC bed through backwash pump action.

50. The method according to claim 1 wherein said rigid tubular instrument has holes in the circumference in the last 4 to 10 inches.

51. The method according to claim 1 wherein the holes in the circumference of the rigid tubular instrument are ⅛ in. to ½ in. in diameter.

52. The method according to claim 1 wherein the structure with a predetermined volume is a fixed bed reactor.

53. The method according to claim 1 wherein the oxygenate(s) is any substance that adds oxygen to a hydrocarbon.

54. The method according to claim 53 wherein the oxygenate(s) is selected from ethers, alkyl ethers, and alkyl alcohols.

55. The method according to claim 54 wherein the oxygenate is selected from branched alkyl ethers and branched alkyl alcohols.

56. The method according to claim 55 wherein the oxygenate is a tertiary carbon atom-containing alkyl ether or a tertiary carbon atom-containing alcohol.

57. The method according to claim 56 wherein the oxygenate(s) is selected from MTBE and TBA, and an ether, alkyl ether, branched alkyl ether.

58. The method according to claim 57 wherein said oxygenate(s) comprises methyl tertiary butyl ether (MTBE) and tertiary butyl alcohol (TBA), and optionally one or more compounds selected from the group consisting of diethyl ether (DEE), dimethyl ether (DME), methyl ethyl ether (MEE), methyl n-propyl ether (MPE), ethyl n-propyl ether, methyl isopropyl ether, ethyl isopropyl ether, di-t-butyl ether, di-isopropyl ether (DIPE), di-isobutyl ether, isopropyl isobutyl ether, ethyl t-butyl ether (ETBE), t-amyl ethyl ether, t-amyl propyl ether, t-amyl isobutyl ether and methyl-t-amyl ether.

59. The method according to claim 57 characterized by improved biodegradation of alkyl ethers and MTBE, the biodegradation of TBA, and reduced frequency of the need to change the activated carbon bed.

60. The method according to claim 57 wherein the biodegrader in (a) is selected from the group consisting of BC-1, ATCC no. 202057, and SC-100.

61. The method according to claim 60 wherein the oxygenate is degraded to carbon dioxide and water.

62. The method according to claim 1 wherein the size of the granular activated carbon particles is larger than 50 mesh (U.S. Standard sieve).

63. The method according to claim 1 wherein the biodegrader in (a) is selected from the group consisting of mixed bacterial cultures and derivatives thereof capable of biodegradation of ethers and pure bacterial cultures and derivatives thereof capable of biodegradation of ethers.

64. The method of claim 63 wherein compositions derived from bacterial cultures are selected from fragments of the bacterial culture, membrane fragments of bacterial culture, enzymes extracted and/or isolated from the bacterial culture, lyophilized and/or dried culture, lyophilized and/or dried fragments of culture, lyophilized and/or dried enzymes derived from said culture, bacterial culture and/or fragments thereof and/or enzymes derived therefrom bound to a carrier and/or binder and/or fixed bed.

65. The method of claim 63 wherein compositions derived from bacterial culture includes compositions derived by any method known to one skilled in the art for making a composition derived from a culture.

66. The method according to claim 63 wherein the biodegrader in (a) is selected from the group consisting of BC-1, ATCC no. 202057, and SC-100.

67. A method of treating groundwater, or other water streams contaminated with at least one oxygenate(s) selected from tertiary alkyl ether(s) and tertiary alkyl alcohol(s), characterized by improved biodegradation of tertiary alkyl ethers and tertiary alkyl alcohols and MTBE, the biodegradation of TBA, and reduced frequency of the need to change the carbon bed which comprises:

a) Inoculating a biodegrader selected from the group consisting of BC-1, ATCC no. 202057, and SC-100, and derivatives thereof, capable of degrading said oxygenate(s) to carbon dioxide and water, onto a granular activated carbon bed (GAC) through a rigid tubular instrument having a plurality of holes around the circumference of the end used for inoculation of the carbon bed; and b) Flowing said groundwater, or other water stream contaminated with said oxygenate(s) through a structure having a top, bottom and sides and a predetermined volume containing said bed of activated carbon having said biodegrader inoculated thereon.

68. The method according to claim 67 wherein the oxygenate(s) is at least one selected from TAME, ETBE, DIPE, MTBE and TBA.

69. An apparatus for the biodegradation of groundwater contaminated with oxygenate(s) which comprises:

a) At least one structure having top, bottom and side walls of predetermined volume (V) containing therein granular activated carbon inoculated with a biodegrader;

b) An inlet port in said structure through which an influent liquid stream containing said oxygenate(s) enters said structure; and c) An outlet port in said structure through which an effluent liquid stream containing degraded oxygenate (s) exits; and d) Wherein said structure is in communication with a holding tank, where said biodegrader is stored for inoculation, by a flexible tube that brings biodegrader from the storage tank to the structure containing the carbon bed, and wherein said flexible tube is connected to a rigid tubular instrument having a plurality of holes in the circumference of the end.

70. The apparatus of claim 69 wherein the reactor comprises a drum reactor.

71. The apparatus of claim 69 wherein the biodegrader in (a) is selected from the group consisting of mixed bacterial cultures and derivatives thereof capable of biodegradation of ethers and pure bacterial cultures and derivatives thereof capable of biodegradation of ethers.

72. The apparatus of claim 71 wherein compositions derived from bacterial cultures are selected from fragments of the bacterial culture, membrane fragments of bacterial culture, enzymes extracted and/or isolated from the bacterial culture, lyophilized and/or dried culture, lyophilized and/or dried fragments of culture, lyophilized and/or dried enzymes derived from said culture, bacterial culture and/or fragments thereof and/or enzymes derived therefrom bound to a carrier and/or binder and/or fixed bed.

73. The apparatus of claim 71 wherein the biodegrader is selected from the group consisting of BC-1, ATCC no. 202057, and SC-100, and derivatives thereof.

74. The apparatus of claim 69 further comprising a pump to control flow between the holding tank and structure containing the inoculated GAC.

75. The apparatus of claim 69 further comprising the rigid tubular instrument is rigid plastic.

76. The apparatus of claim 69 further comprising said rigid tubular instrument is a metal.

77. The apparatus of claim 76 wherein the rigid tubular instrument is stainless steel.

78. The apparatus of claim 69 further comprising said rigid tubular instrument has holes in the circumference of the end that contacts the GAC.

79. The apparatus of claim 69 further comprising the dimensions of the rigid tubular instrument are appropriate to the size of the structure containing the carbon bed.

80. The apparatus of claim 79 wherein said rigid tubular instrument has a overall diameter of from ½ in to 2 in.

81. The apparatus of claim 70 wherein said rigid tubular instrument is about 2 to 10 ft. in length from the connection to said flexible tubing to the end with the holes.

82. The apparatus of claim 79 wherein said instrument has holes in the circumference in the last 2 in. to 1 ft.

83. The apparatus of claim 82 wherein the holes are ⅛ in to ½ in. in diameter.

84. The apparatus of claim 79 further comprising the rigid tubular instrument is stainless steel, about 4 ft. long with an overall diameter of about ¾ in., and having about 4 to 6 holes of a diameter of about ⅛ to ¾ in. drilled in about the last six inches.

85. The apparatus of claim 69 further comprising a back wash pump for fluidizing the GAC bed.

86. The apparatus of claim 69 further comprising said outlet of said structure is connected to a vertical piece of rigid pipe with a tee just slightly above the level of the top of the GAC bed, wherein the tee is characterized by a straight through portion and a middle portion.

87. The apparatus of claim 86 further comprising the straight through portion of the tee is connected to a short piece of vertical pipe open to the atmosphere that serves as a vacuum breaker.

88. The apparatus of claim 86 further comprising the middle part of the tee is connected to a flexible hose, which goes to the tank containing biodegrader.

89. The apparatus of claim 88 which allows water carrying the biodegrader onto the GAC bed to return to the holding tank while the biodegrader is retained on the bed through filtration by carbon particles in the bed.

90. The apparatus of claim 69 further comprising a means for adding an oxygen source and nutrients.

91. The apparatus of claim 69 further comprising a means for monitoring pressure and a means for releasing pressure.

* * * * *